United States Patent [19]

Lee

[11] Patent Number: 5,214,513
[45] Date of Patent: May 25, 1993

[54] APPARATUS FOR IMPARTING MOTION TO A SOLID-STATE IMAGE SENSOR

[75] Inventor: J. Kelly Lee, Rochester, N.Y.

[73] Assignee: Eastman Kodak Company, Rochester, N.Y.

[21] Appl. No.: 728,404

[22] Filed: Jul. 11, 1991

[51] Int. Cl.$^5$ .......................... H04N 5/30; H01F 3/00
[52] U.S. Cl. ................. 358/209; 358/213.28; 335/279; 335/281
[58] Field of Search ............. 358/209, 213.11, 213.28; 354/270, 271.1, 234.1, 235.1, 446, 453, 454, 440, 435; 335/220, 281, 279, 235, 188, 190; 359/811, 813, 819, 874

[56] References Cited

U.S. PATENT DOCUMENTS

| 3,477,049 | 11/1969 | Kreidler | 335/279 |
|---|---|---|---|
| 3,993,972 | 11/1976 | Barbrook | 335/281 |
| 4,240,728 | 12/1980 | Wiedmann et al. | 354/453 |
| 4,386,823 | 6/1983 | Musha | 359/813 |
| 4,517,603 | 5/1985 | Epsztein et al. | |
| 4,543,601 | 9/1985 | Harada et al. | 358/209 |
| 4,551,660 | 11/1985 | Suzuki | 335/268 |
| 4,634,884 | 1/1987 | Hayashimoto et al. | 358/213.28 |
| 4,655,548 | 4/1987 | Jue | 358/209 |
| 4,755,876 | 7/1988 | Dangler | 358/50 |
| 4,769,803 | 9/1988 | Yamamiya | 359/813 |
| 4,803,557 | 2/1989 | Bridges | 358/213.11 |
| 4,811,320 | 3/1989 | Kawasaki et al. | 359/813 |
| 4,947,239 | 8/1990 | Kondou et al. | 358/213.28 |
| 5,063,460 | 11/1991 | Mutze et al. | 358/209 |

FOREIGN PATENT DOCUMENTS 2803114 7/1979 Fed. Rep. of Germany ........ 335/81

Primary Examiner—Herbert Goldstein
Assistant Examiner—Wendy R. Greening
Attorney, Agent, or Firm—Mark Z. Dudley

[57] ABSTRACT

A driving apparatus for imparting motion to an image sensor is disclosed that includes a frame structure, a support spring coupled to the frame structure, a support structure coupled to the support spring and a foundation structure, wherein the support structure keeps the support spring suspended above the foundation structure, a first drive solenoid coupled to a first side of the frame structure, and a second drive solenoid coupled to a second side of the frame structure that is adjacent to the first side of the frame structure wherein at least one drive solenoid includes a solenoid body, a magnetic coil, and a magnetically deflectable solenoid beam.

11 Claims, 3 Drawing Sheets

APPARATUS FOR IMPARTING MOTION TO A SOLID-STATE IMAGE SENSOR

FIELD OF THE INVENTION

The invention relates in general to electronic imaging systems employing solid-state image-sensors, and specifically, to electronic imaging systems incorporating drive devices for imparting motion to the solid-state image sensor employed in the imaging system during exposure operations to improve the resolution of the system.

BACKGROUND

A conventional method of improving the resolution of an electronic imaging system incorporating a solid-state image sensor is to move the image with respect to the sensor between successive exposure or image capture operations to capture an additional field of image information. U.S. Pat. No. 4,755,876 issued to Dangler, for example, discloses a image scanner system which employs "X" and "Y" deflector plates driven by DC motors to move an image over a low resolution image sensor to effectively fill gaps in image coverage between photosites. The system disclosed in Dangler, however, is bulky and not well suited for use in compact imaging systems such as hand-held electronic cameras.

Other, more compact, systems employ the use of piezoelectric devices to physically move the image sensor during exposure operations. U.S. Pat. No. 4,947,239 issued to Kondou et al. discloses a swing-driven solid-state imaging device mounted on a piezoelectric element which vibrates the sensor in order to move the imaging device to different sampling positions at different points of time in one frame period. The image information gathered at the different sampling positions is combined to form one complete image frame. The system employed by Kondou et al. is limited to providing motion in a single direction. Still another example of a piezoelectric swing-driven image sensor is disclosed in U.S. Pat. No. 4,634,884 issued to Hayashimoto et al.

Piezoelectric devices do provide a compact drive mechanism as demonstrated by the structure disclosed in the above-noted references, but piezoelectric drive elements are also expensive and therefore are not commercially suitable in situations where the expense of the system is a critical factor to the systems commercial viability. A need therefore exists within the field of electronic imaging for an apparatus that provides image sensor movement, preferably in two directions, to improve resolution utilizing a compact structure which can be easily and inexpensively manufactured. In view of the above, it is an object of the invention to provide a driving apparatus for an image sensor that is durable, inexpensive and easily manufactured. It is further object of the invention to provide a driving apparatus that is capable of moving the image sensor in two dimensions.

SUMMARY OF THE INVENTION

The invention provides a driving apparatus for an image sensor that is durable, inexpensive and easy to manufacture by utilizing drive solenoids to impart motion to a frame structure in which the image sensor can be mounted. More specifically, in a preferred embodiment, a driving apparatus is provided that includes a frame structure, a support spring coupled to the frame structure, a support structure coupled to the support spring and a foundation structure, wherein the support structure keeps the support spring suspended above the foundation structure, a first drive solenoid coupled to a first side of the frame structure, and a second drive solenoid coupled to a second side of the frame structure that is adjacent to the first side of the frame structure.

In operation, drive signals are supplied to the first and second drive solenoid from a drive circuit causing a solenoid beam of each of the drive solenoids to flex. The solenoid beams of the first and second drive solenoid are coupled to the frame structure which is used to support an image sensor. Thus, the flexing motions of the solenoid beams are imparted to the frame structure and any image sensor mounted thereto.

BRIEF DESCRIPTION OF THE DRAWINGS

With the above as background, reference should now be made to the following detailed description of the preferred embodiments along with the accompanying drawings in which.

DETAILED DESCRIPTION OF THE PREFERRED EMBODIMENT

Figure 1:
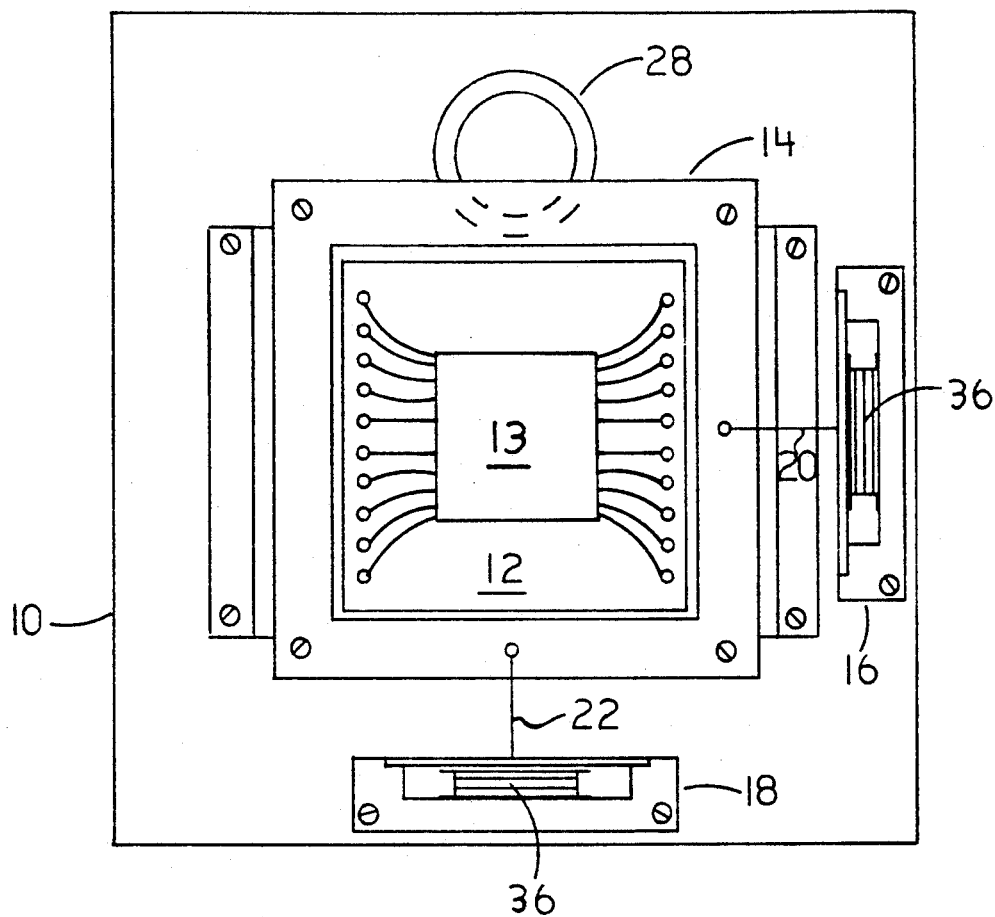
FIG. 1 is a top view of a two dimensional driving apparatus for an image sensor in accordance with the present invention.
Figure 2:
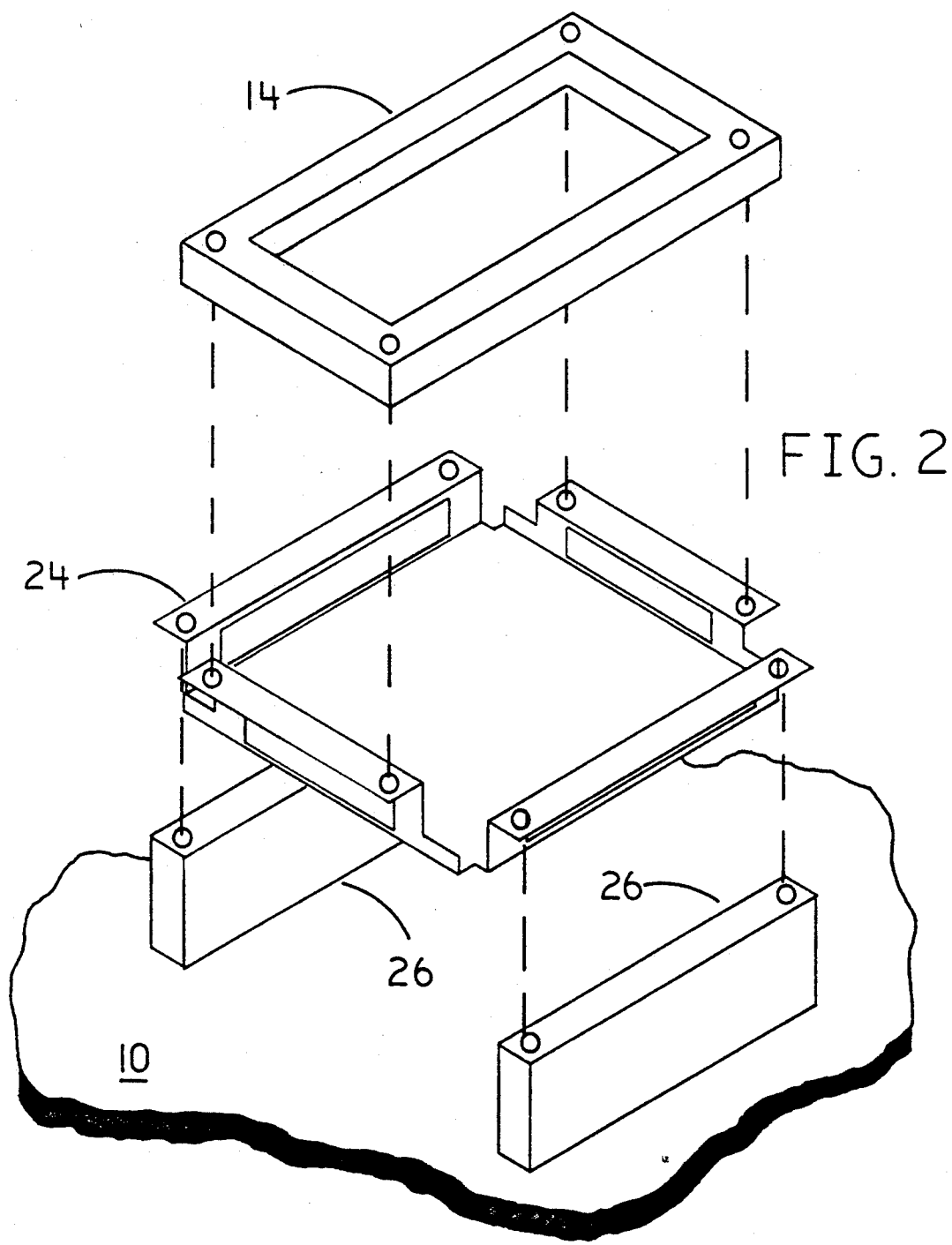
FIG. 2 is a partial exploded perspective view of the two dimensional driving apparatus illustrated in FIG. 1.

Referring now to FIG. 1, a top view of a two dimensional driving apparatus in accordance with the present invention is shown including a base or foundation 10, a circuit board 12 having an image sensor 13 mounted thereon coupled to an aluminum frame 14, and two drive solenoids 16, 18 respectively coupled to the frame 14 via connection wires 20, 22. As shown in greater detail in FIG. 2, the frame 14 is mounted to a support spring 24 which in turn is coupled to the foundation 10 on two sides via supports 26. The support spring 24 is preferably stamped from a single piece of metal and bent to the illustrated configuration. The supports 26 may be a solid block of material as illustrated or any other structure having sufficient height to keep the support spring 24 suspended above the foundation 10. A rubber button 28, preferably ISODAMP C-1000 available from Ear Specialty Composites, Indianapolis, Ind., is provided between the support spring 24 and the foundation 10 under one side of the aluminum frame 14 as shown in FIG. 1. Activation of the solenoids 16, 18 causes the respective connection wires 20, 22 to be pulled toward the bodies of the solenoids 16, 18 thereby imparting motioin to the aluminum frame 14.

Figure 3:
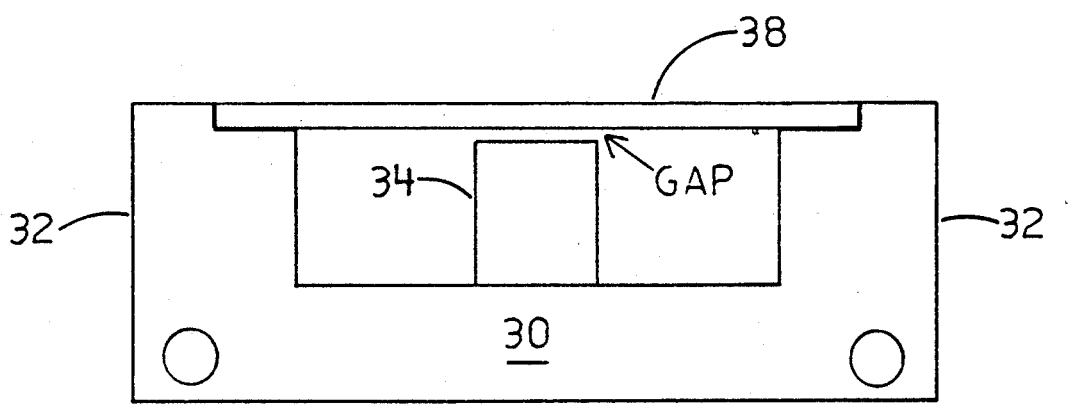
FIG. 3 is a top view of a solenoid body employed in the apparatus illustrated in FIG. 1.
Figure 4:
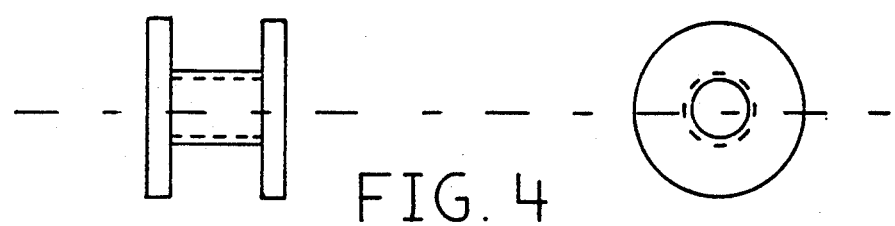
FIG. 4 is a side view of a bobbin employed in the apparatus illustrated in FIG. 1.

A detailed illustration of the construction of the solenoids 16, 18 is provided in FIG. 3. Each of the solenoids 16, 18 includes an "E" shaped solenoid body 30 having two raised end portions 32 and a raised central portion 34 that is lower than the end portions 32. A coil 36 (See FIG. 1) composed of 550 turns of #38 AWG wire wound around a LEXAN bobbin (illustrated in FIG. 4) is located on the raised central portion 34 before a solenoid beam 38 is fastened on the two raised end portions 32 of the solenoid body 30. The solenoid body 30 is shown iwthout the coil 36 in FIG. 3 so that the solenoid body 30 may be clearly illustrated. The solenoid beam 38 is preferably composed of a 0.025 inch thick piece of silicon iron approximately one inch long and having a width of 0.200 inches. A small gap, preferably in the range of 0.006±0.001 inches, is provided between the solenoid beam 36 and the raised central portion 34.

In operation, a drive current is applied to the coil 36 via a drive circuit. The application of the drive current to the coil 36 creates a magnetic field which causes the solenoid beam 36- to be drawn to the raised central portion 34 of the solenoid body 30, i.e., the solenoid beam 36 bends or flexes toward the raised central portion 34. The movement of the solenoid beam 36 is transmitted to the respective connection wire 20, 22 coupled thereto, which in turn transmits the movement to the aluminum frame 14 and the circuit board 12 coupled thereto.

Figure 5:
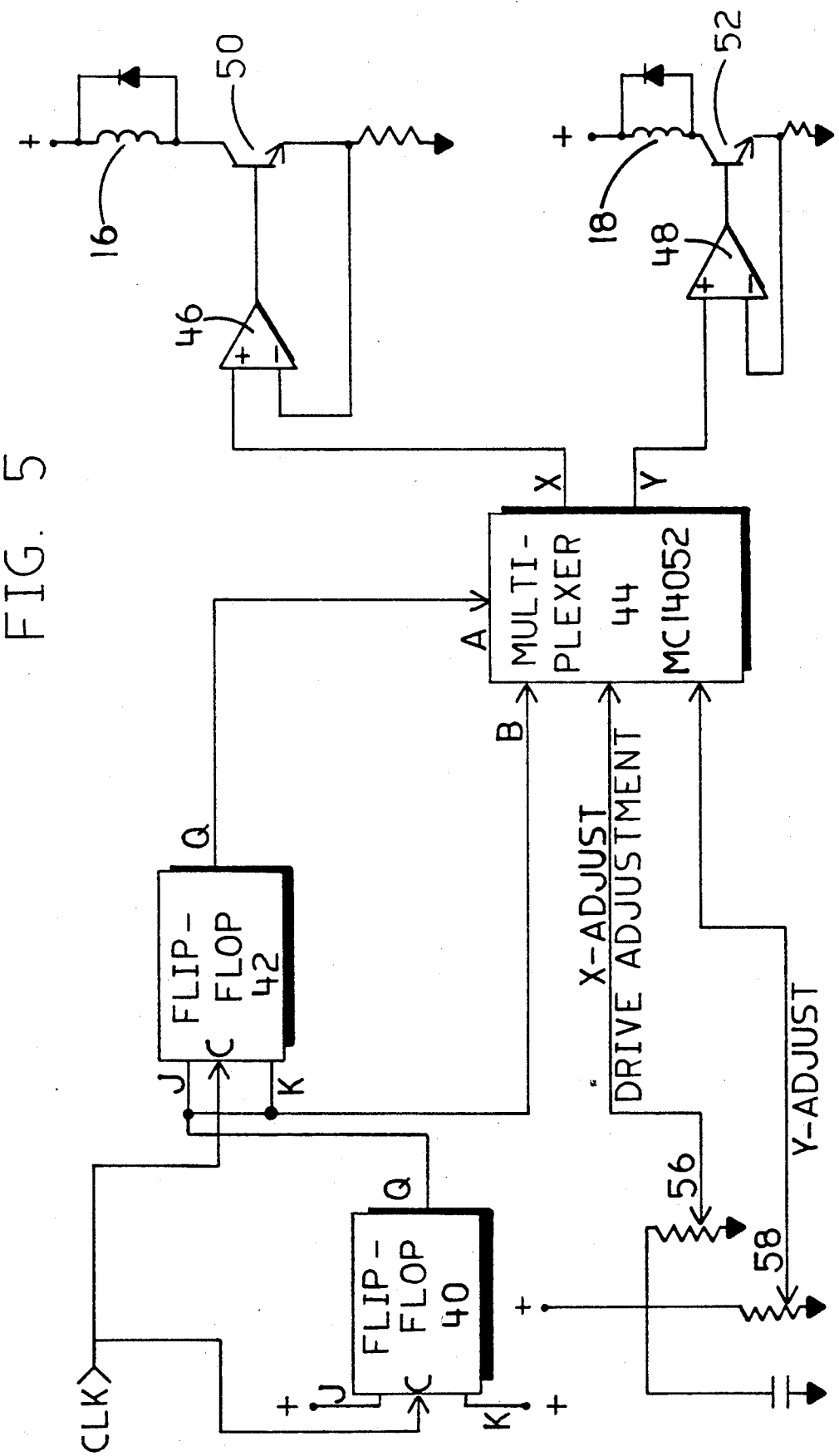
FIG. 5 is an electronic drive circuit employed to drive the two dimensioinal driving apparatus illustrated in FIG. 1.

A preferred drive circuit is illustrated in FIG. 5. A clock signal CLK is supplied to two flip-flops 40, 42. The output lines from the flip-flops 40, 42 are coupled to a multiplexer 44, which in turn are coupled to operational amplifiers 46, 48 that control the operation of two drive transistors 50, 52. The drive transistors 50, 52 are coupled to coils of the two drive solenoids 16, 18 and control the flow of current through the solenoids.

In operation, the output lines of the flip-flops 40, 42 change state in response to the received clock signal CLK presenting a series of logic "ones" and "zeros" to the inputs of the multiplexer 44. The output lines of the multiplexer 44 change state in accordance with the logic signals applied to the inputs of the multiplexer 44. The magnitude of the voltage on the output lines of the multiplexer 44 is controlled by the setting on the potentiometers 56, 58. The output lines of the multiplexer 44 in turn cause the operational amplifiers 46, 48 to activate the drive transistors 50, 52 thereby permitting the proper current to flow through the coils of the drive solenoids 16, 18, i.e., the operational amplifiers 46 and 38 are used to convert the multiplexer voltage outputs to constant current in the drive solenoids.

In the preferred embodiment illustrated, the drive solenoids 16, 18 are turned on in a sequence that cause the frame 14 to move in a rectangular or square pattern. Each pixel of an image sensor 13 located on the circuit board 12 can be activated to capture a plurality of different image points, preferably one at each corner of the rectangle or square, which are then combined into a single image with twice the resolution in both X and Y directions. Thus, an inexpensive low resolution sensor mounted on the circuit board 12 can be used to generate a higher resolution image.

The invention is particularly useful in applications where expense is a major factor in the commercial realization of the system including, for example, consumer electronic imaging systems. The drive solenoids employed by the invention are inexpensive to manufacture in large quantities when compared to piezoelectric drive elements. The drive circuitry required to control the drive solenoids is also less complicated and less expensive to manufacture.

The invention has been described with reference to certain preferred embodiments thereof. It will be understood, however, that modifications and variations are possible within the scope of the appended claims. For example, different materials may be used for the construction of the drive solenoids. A variety of drive circuits may also be employed to control the drive solenoids in any desired fashion, for example, to produce a circular movement of the frame instead of a rectangular or square movement. In addition, more than four sample positions can also be achieved with the mechanism shown in FIG. 1 by using a multiplexer that is capable of producing a large variety of output voltages. It should also be noted that the circuit board 12 can be mounted directed to the spring 24 if desired. In such a case, the circuit board itself would act as the frame structure to support the image sensor and the connection wires would be directly coupled to the circuit board. The invention is also of applicable to an electronic imaging system where movement of the image sensor along a single direction is required. In such a case, only one drive solenoid would be employed.

What is claimed is:

1. An apparatus for imparting motion to an electronic image sensor comprising:
    frame means for retaining an electronic image sensor;
    a support spring coupled to the frame means; support means for suspending the support spring, wherein the support spring can freely move in at least one dimension; and
    at least one drive solenoid coupled to the frame means, wherein the drive solenoid includes an "E" shaped solenoid body having first and second raised end portions and a raised central portion that is lower than the first and second raised end portions, and a solenoid beam located above the raised central portion and coupled to the first and second raised end portions.

2. An apparatus for imparting motion to an electronic image sensor as claimed in claim 1, wherein the frame means includes an aluminum frame member.

3. An apparatus for imparting motion to an electronic image sensor as claimed in claim 2, wherein the frame means further comprises a circuit board coupled to the aluminum frame member.

4. An apparatus for imparting motion to an electronic image sensor as claimed in claim 1, wherein the frame means comprises a circuit board.

5. An apparatus for imparting motion to an electronic image sensor as claimed in claim 1, wherein the support spring includes first and second sides coupled to the support means and third and fourth sides coupled to the frame means.

6. An apparatus for imparting motion to an electronic image sensor as claimed in claim 1, wherein the solenoid beam is coupled to the frame means via a connecting wire.

7. An apparatus for imparting motion to an electronic image sensor as claimed in claim 6, wherein the drive solenoid includes a wire wound bobbin coil mounted on the raised central portion of the solenoid body.

8. An apparatus for imparting motion to an electronic image sensor comprising: a frame structure adapted for supporting the image sensor; a support spring coupled to the frame structure; a support structure coupled between the support spring and a foundation structure; first and second drive solenoids each having a respective deflectable solenoid beam and magnetic means for deflecting the solenoid beam;
    means for coupling movement of the first and second solenoid beams respectively to first and second sides of the frame structure.

9. An apparatus for imparting motion to an electronic image sensor as claimed in claim 8, further comprising a drive circuit coupled to the first and second drive solenoids.

10. An apparatus for imparting motion to an electronic image sensor as claimed in claim 8, wherein the deflection means further comprises an "E" shaped solenoid body having first and second raised end portions and a raised central portion that is lower than the first and second end portions; a coil mounted on the raised central portion; wherein the respective solenoid beam is located above the central portion and coupled to the first and second end portions.

11. A solenoid comprising:
an "E" shaped solenoid body having first and second raised end portions and a raised central portion located therebetween and extending less than the first and second raised end portions;
a deflectable solenoid beam located above the raised central portion and coupled to the first and second raised end portions; and
a coil mounted on the raised central portion of the solenoid body;
wherein the solenoid beam is deflectable in response to a magnetic field established by the coil.

* * * * *